Patented Apr. 29, 1930

1,756,158

UNITED STATES PATENT OFFICE

GERALD J. LEUCK, OF EVANSTON, ILLINOIS, ASSIGNOR TO THE QUAKER OATS COMPANY, OF CHICAGO, ILLINOIS, A CORPORATION OF NEW JERSEY

MANUFACTURE OF DITHIO DERIVATIVES FROM ALDEHYDES

No Drawing.   Application filed August 11, 1926.   Serial No. 128,709.

This invention relates to an improved method for the manufacture of dithio derivatives from aldehydes and it is especially adapted to the production of dithiofuroic acid and its salts from furfural. Dithiofuroic acid and its salts have not been manufactured commercially heretofore nor have they, so far as I am aware, been produced extensively even in the laboratory. The previously known laboratory methods for the preparation of dithiofuroic acid utilize expensive materials and give small yields of a comparatively impure product. They are, in addition, not readily adaptable to factory or commercial conditions.

My improved method utilizes cheap and readily available raw materials and gives relatively high yields of dithiofuroic acid of a purity satisfactory for commercial use such, for example, as when employed in accelerating the vulcanization of rubber for which purpose dithiofuroic acid and its salts are useful. My process is simple and economical to practice and is readily adaptable to large scale operation.

In the best published methods, the raw materials used with the aldehydes are ammonium sulfide and sulfur, with or without the addition of alcohol. After the reaction has taken place, the dithiofuroic acid is separated by extraction with ether and is either used as such or is utilized in the preparation of the salts of dithiofuroic acid. These methods state that an alkali compound may be substituted for the ammonium compound but does not give as good results.

It has recently been found possible to greatly improve the yields obtainable by these old methods by adding to the reaction mixture a suitable solvent for the raw materials and the intermediate and final products. Benzol is an example of such a solvent and by its use increased yields and a purer product result. Even this method has certain obvious disadvantages as an industrial process.

In my improved process, I use instead of an ammonium sulfur compound a water soluble sulfide of a metal such as sodium or calcium.

The old methods stated as noted above, that an alkali polysulfide may be used instead of an ammonium polysulfide but that the results are not so good. I have experimented by substituting such polysulfides as those of sodium, calcium, barium and potassium for the ammonium polysulfide in the old method, and I have invariably found this statement to be correct as usually both the yield and quality of the dithiofuroic acid and its salts are poorer when the alkali sulfur compound is used.

By my present invention, I can advantageously use a cheap and readily available sulfide, such as sodium sulfide, but in order to do so, I add another constituent, namely, an acid ingredient, in proper proportion. I am thus able to obtain greatly increased yields and a highly improved quality of dithiofuroic acid from furfural or other dithio acids from the corresponding aldehydes. This reaction is so readily controllable that I find it possible to carry the process to a point whereupon adding an excess of acid to the reaction mixture no substantial amount of hydrogen sulfide is evolved and it is consequently feasible to precipitate the dithiofuroic acid directly with a lead, zinc or other metal salt and thus prepare the insoluble dithiofuroates free from substantial amounts of sulfide without previously separating and redissolving the dithiofuroic acid as was necessary in the old methods. My method also makes it possible to separate dithiofuroic acid from the reaction mixture without resorting to the expensive, difficult and dangerous expedient of extracting it by means of a volatile solvent such as ether.

The amount of acid substance which I add with beneficial results may vary up to a quantity somewhat less than the chemical equivalent of the metal present. Various acid substances, such as organic or inorganic acids or acid salts may be used.

It will be understood, of course, that in operating my improved method, I may utilize a wide range of conditions, i. e., I may vary the properties of ingredients, aldehyde, metal sulfide, sulfur and acid substances or may carry out the reaction at high or low temperature, with or without pressure.

It is desirable under ordinary conditions to continue the reaction until the specified end point as determined by the side test described above, i. e., until a minimum of hydrogen sulfide is evolved upon addition of excess acid, but a fairly good yield and quality of product may be obtained without carrying the reaction to this point. It is, of course, feasible to prepare the dithio acid by my improved acid process and then separate it by extraction with a volatile solvent in accordance with the old methods but under ordinary conditions this is not desirable.

One embodiment of my process which gives satisfactory results is as follows and I am appending herewith my theory of the chemical reactions which occur as I, at present, interpret them but I do not desire to be bound thereby.

To 11 pounds of commerical crystalline sodium sulfide add 16.5 pounds of water and 2.5 pounds of sulfur stirring the composition until the temperature falls to 0° C. At this point sodium polysulfide is produced. Then add slowly with continued stirring, 7.5 pounds of 27.7° Bé. sulfuric acid. At this point sodium hydrosulfide and sodium hydropolysulfide is produced. It is desirable not to add this acid so rapidly as to cause any considerable evolution of hydrogen sulfide. 3.8 pounds of furfural are then added rapidly and the mixture heated to 80° C. in from 30–45 minutes during which period an additional 0.8 pounds of sulfuric acid (27.7° Bé.) is added. During the succeeding half hour, 1.4 pounds of acid of the same strength is added, care being taken to hold the temperature close to 80° C. This mixture will now contain sulfates, sodium dithiofuroate, tarry matter and other by-products of the reaction together with slight amounts of unreacted furfural. This mixture may be purified by cooling and filtering or decanting to remove tarry matter and solid sulfates or it may merely be filtered or decanted to remove tarry matter. In the latter case, the dithiofuroic acid or its salt as ultimately precipitated may receive additional washing with cold water to remove solid sulfates.

One of the advantages of my process is that it is possible to prepare either dithiofuroic acid or its salts directly from the same reaction mixture. In preparing dithiofuroic acid, after the removal of tarry matter and inorganic salts or both, an acid such as sulfuric acid is added until a side test made by adding additional acid to a filtered portion of solution shows no further separation of dithiofuroic acid. The dithiofuroic acid separates as a reddish purple oil and may be removed by means of an ordinary separator or by decantation and washed with water.

In preparing the salts, the solution remaining at the end of the reaction is suitably diluted and a water soluble salt of the metal is added, such addition being continued until the solution is decolorized to a light yellow. For example, if it is desired to prepare zinc dithiofuroate, the solution of sodium dithiofuroate prepared as above is diluted by the addition of 10 volumes of water and a 20% solution of zinc chloride is added slowly with constant stirring until the reddish color of the solution is removed and only a slight yellowish tint remains. The precipitated zinc dithiofuroate is separated by the usual means, such as a centrifuge, filter press or other suitable apparatus and is thoroughly washed and dried.

As another example of the preparation of a salt of dithiofuroic acid, lead dithiofuroate may be prepared in a manner entirely analogous to the preparation of zinc dithiofuroate, as given above, by substituting a 20% solution of lead acetate for a 20% solution of zinc chloride.

Because of its extreme insolubility, lead dithiofuroate may be precipitated in the presence of an acid substance which gives a lead salt usually considered insoluble such as the sulfate. For example, when sulfuric acid is used as the acid substance in the preparation of the dithiofuroate solution, as given above, and lead acetate is gradually added until the point has been reached where the reaction mixture is decolorized to a light yellow, the dithiofuroate will be practically entirely precipitated as the extremely insoluble lead dithiofuroate without the precipitate containing any substantial amount of lead sulfate.

In this method I may, for example, substitute benzaldehyde for furfural and I may use another metal sulfide such as of calcium or of barium instead of the sodium sulfide and other acid substances such as acetic acid or acid salts instead of sulfuric acid.

While I refer herein to "water soluble sulfur compounds of a metal", "metal sulfur compounds" and "sulfide", it is to be understood that these terms refer to the sulfides, the polysulfides and the hydropolysulfides of metals and do not comprehend within their scopes other inoperative sulfur compounds of metals which would obviously be inoperative for the purposes intended herein to the man skilled in the art.

Advantages of my improved method over the previously known methods will be obvious to those familiar with chemical manufacturing processes. Among these advantages are the following: increased yields reaching at least twice those obtainable by previously known methods; elimination of the dangers, difficulties and expense resulting from the use of alcohol, ether or other volatile and inflammable solvent; facility in large scale operation; greater purity of product because of the freedom of the mixture at the end of
the reaction from undesirable dissolved sulfur compounds and consequent possibility of
preparing salts of dithiofuroic acid direct
from reaction mixture; economy since the
cheap raw materials, sodium sulfide and sulfuric acid are used instead of ammonium
sulfide and, in addition, the expensive volatile solvents are eliminated; convenience in
the use of the solid sodium sulfide instead of
the solution of ammonium sulfide.

While I have herein described a process for
manufacturing dithio derivatives from aldehydes and particularly a process for producing dithiofuroic acid and its salts from fur-